Figure 1:
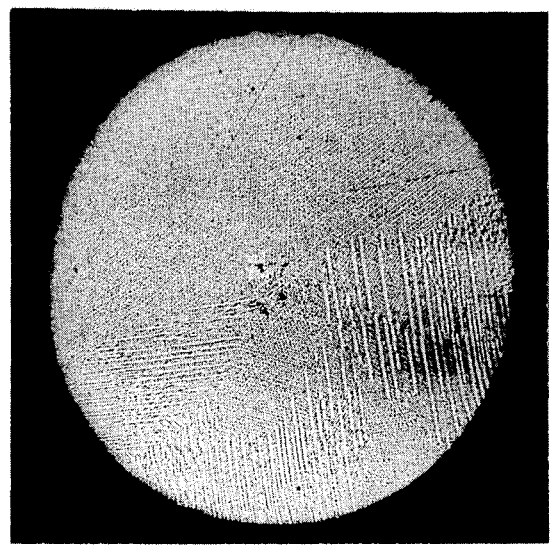

United States Patent

[11] 3,583,471

[72] Inventor Erich Kemming
       Apelter Weg 9, Buderick near Dusseldorf, Germany
[21] Appl. No. 785,067
[22] Filed Dec. 17, 1968
[45] Patented June 8, 1971

[54] MANUFACTURE OF CARBIDE-CONTAINING WELDING RODS
10 Claims, 4 Drawing Figs.
[52] U.S. Cl. .................................................. 164/97,
       164/51, 29/191.2, 164/49, 164/138, 164/58,
       219/145, 75/171
[51] Int. Cl. ................................................. B22d 23/00
[50] Field of Search .................................... 164/58, 57,
       55, 97, 61, 62, 63, 65; 219/145, 146.5; 75/171;
       29/191.2

[56] References Cited
UNITED STATES PATENTS
| 1,897,589 | 2/1933 | Reeve | 164/65X |
| 1,950,356 | 3/1934 | Debats | 164/57 |
| 2,002,198 | 5/1935 | Wissler | 219/145X |
| 2,002,462 | 5/1935 | Woods | 219/145X |
| 2,162,574 | 6/1939 | Dawihl et al. | 148/13 |
| 2,952,056 | 9/1960 | Shuck | 164/258X |

Primary Examiner—J. Spencer Overholser
Assistant Examiner—V. K. Rising
Attorneys—Curt M. Avery, Arthur E. Wilfond, Herbert L. Lerner and Daniel J. Tick ABSTRACT: Carbide-containing welding rods for use in the deposition by welding of wear-resistant layers are made from a melt by a process in which, while the melt is continuously stirred, the carbide, which is in granular form and has a melting point above the temperature of the melt, is added to the melt and portions of the carbide-containing melt are then drawn off into heat resistant vacuum tubes where they are allowed to solidify to form the rods.

MANUFACTURE OF CARBIDE-CONTAINING WELDING RODS

This invention relates to processes for making carbide-containing welding rods such as are used in the deposition by welding of wear-resistant layers.

High carbon alloys, which are known as stellites and include cobalt, chromium, tungsten, optionally molybdenum and the remainder iron, have an austenitic structure with layers of carbide inclusions. Because of their great hardness, wear and heat resistance and also their resistance to oxidation and other corrosion, such alloys are often used for the deposition of layers by welding, for example for valve facings, valve seating rings, superheated steam valves, hot working and press forging tools and drilling bits. The high wear resistance of these alloys results from the carbide inclusions embedded in the austenitic matrix. As the heat of reaction in the formation of chromium carbide is greater than that of tungsten carbide, it is not always possible to obtain the desired quantity of tungsten carbide in the melt of a chromium containing alloy at the usual melting temperature of about 1400° C. in dependence upon the chromium and carbon contents.

In order to increase the wear resistance of stellite alloys, sintered or molten tungsten carbide in the form of a powder or grains have been added to the alloy melt. For this purpose the preferred alloy melt has the following analysis:

1.0 percent carbon
30.0 percent chromium
1.0 percent silicon
5.0 percent tungsten
up to 3.0 percent iron
up to 3.0 percent nickel and the remainder cobalt. The stability of tungsten carbides at very high temperatures is so great that the carbon in the carbides does not react with the metallic chromium in the melt to any appreciable extent. However the disadvantage of adding tungsten carbide in granular form is that it tends to segregate at the bottom of the melt or in the bottoms of the molds when welding rods are cast from the melt as it has a higher specific gravity than that of the melt. The segregation in the molds is increased if the welding rods are cast by a centrifugal process as the centrifugal forces acting on the granular carbide is greater than the effect of gravity. This segregation results in a nonuniform distribution of the tungsten carbides in the welding rods and this in turn results in a nonuniform distribution of the tungsten carbides in the deposited layer of weld metal. This gives rise to nonuniform wear resistance of the deposited layer which results in local premature wear.

The aim of the present invention is to try and overcome this segregation problem and to this end, according to this invention, carbide-containing welding rods are made from a melt in which, while the melt is continuously stirred, the carbide, which is in granular form and has a melting point above the temperature of the melt is added to the melt and portions of the carbide-containing melt are then drawn off into heat resistant vacuum tubes where they are allowed to solidify to form the rods.

Any carbides having a melting point higher than the melting point of the melt can be used, but carbides such as molybdenum or tungsten carbide having a melting point above 2500° C. are preferred. Stirring of the melt causes the stable carbides to be kept in the melt in a finely dispersed state. The subsequent rapid discharge of portions of the melt and the rapid solidifying of the melt brought about by the vacuum prevents unwanted segregation of the heavy carbide particles.

Another advantage of the process in accordance with the invention is that the welding rods have a very smooth surface after discharge from the vacuum tubes and they have a highly polished appearance and are so clean that no further surface treatment is necessary. Further, the drawing of the melt into the tubes by the application of a vacuum ensures that the drawn-up portions of the melt are thoroughly degassed. Consequently the layers deposited by the welding rods also have a very small gas content.

The process in accordance with the invention is particularly satisfactory when used with a basic melt which consists, in percentages by weight of up to 3 percent carbon, 15 percent to 35 percent chromium, 40 percent to 65 percent cobalt, up to 4 percent silicon and the remainder iron. Up to 40 percent of carbide, which is preferably tungsten carbide is then added to the basic melt. The tungsten carbide may be produced by a sintering or melting process and the highly wear-resistant tungsten carbide $W_2C$ is most suitable for this purpose. A minimum carbide content of 7 percent is preferred to produce an excellent abrasion resistance. The tungsten carbide in powdered form in preferably added to a melt which includes cobalt and carbon and chromium is added to the melt after the carbide. In this way the tungsten carbide particles are wetted by the cobalt and thus have a greater stability than they would have if the tungsten carbide were added after the chromium. The stability of the tungsten carbide can be further increased by adding the tungsten carbide in the form of mixed crystals containing titanium, tantalum and/or niobium carbide.

The heat-resistant vacuum tubes may be made of heat resistant material which is able to withstand the temperature of the melt, or alternatively the tubes may be made heat resistant by being water-cooled. Preferably the tubes are made of quartz. Particularly satisfactory stirring of the melt can be obtained by electrical induction and in this case the melt is also heated by the induced currents.

The use of carbides produced by the sintering or melting process results in a further increase in wear resistance.

The initial carbon content of the melt to which the carbide is added should be adjusted in relation to the chromium content of the melt in such a way that, insofar as it is possible, only $Cr_4C$ is formed. For this purpose the carbon content should not exceed 5 percent by weight of the chromium content. In order to form a tough matrix which has both high wear resistance and a satisfactory impact strength, the carbon content of the melt before the addition of the carbide should be small. The increase of the viscosity of the melt which is brought about by the suspension of the carbide particles in it, may be reduced by increasing the silicon content of the melt up to 4 percent. This increase of the silicon content also results in the production of a matrix having a fine grained dendritic structure which also aids in increasing the wear resistance. To produce a uniform distribution of the tungsten carbide it is desirable to add molten or sintered tungsten carbide of a grain size of substantially 1 micron to the initial melt. Particularly good results are attained by adding tungsten carbide ($W_2C$) the tungsten carbide being manufactured by melting together tungsten and carbon. The melting point of this tungsten carbide is about 2730° C. and it is stable in the melt. Tungsten carbide (WC) produced by the sintering process is generally unstable, that is to say the components split up, particularly when melting takes a long time owing to the presence of chromium and more or higher chromium carbides are formed. The stability of the carbides produced by the sintering process, particularly tungsten carbide, in the initial melt can be increased by adding the carbide in a mixed crystal form containing titanium, tantalum, and/or niobium carbide. These mixed crystals may also be added together with some molybdenum carbide.

Figure 2:

As a comparative test, some welding rods were made in the following manner: first a stellite melt was produced in an induction furnace and this melt had the following composition:

1.0 percent carbon
30.0 percent chromium
1.0 percent silicon
5.0 percent tungsten
up to 3.0 percent iron
up to 3.0 percent nickel and the remainder cobalt. Granular tungsten carbide was added to this melt in the usual way whilst the melt was being stirred by the eddy currents induced in it. After this the electric power supply to the furnace was shut off and the stirring movement decreased. Then the melt containing the tungsten carbide particles was cast into molds to form welding rods at a temperature of from 1400 to 1450° C. After the formation of the welding rods the micrographs shown in FIGS. 1 and 2 were made. As is shown in FIG. 1, the welding rods made by this process have a coarse dendritic structure. The electronic optical picture shown in FIG. 2 shows a banded laminated and blacklooking chromium carbide as well as white spots of metallic tungsten in a nonuniform distribution which is brought about by the reaction of carbon from the tungsten carbide with the chromium. Layers deposited by welding from these welding rods showed a considerable tendency to crack while the deposited layer was hardening which is a result of the high carbon and chromium carbide contents of the cobalt-chromiun residue melts and the banded structure of the chromium carbides. In addition to this the deposited layer showed a nonuniform wear resistance owing to the nonuniform distribution of the tungsten carbide and the inclusions of metallic tungsten.

Figure 3:
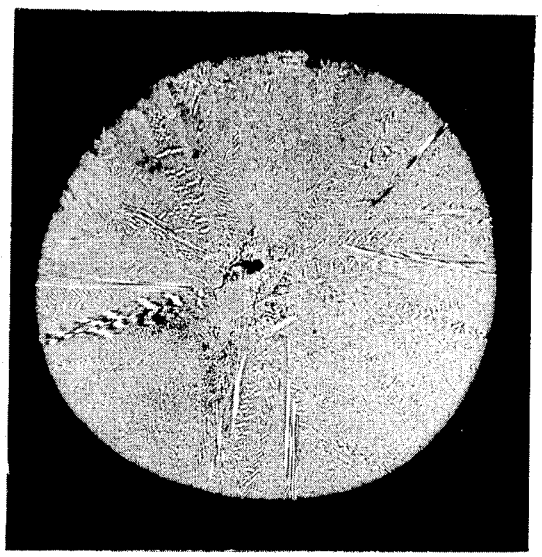
Figure 4:
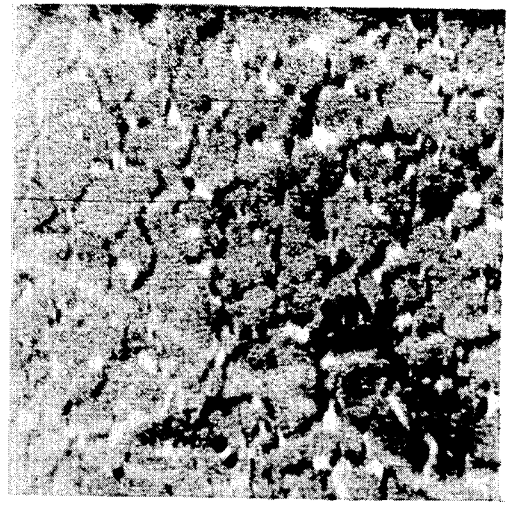

By way of comparison, in a particular example of the present invention, cobalt of high purity and in an amount of approximately 70 percent by weight, and 30 percent chromium of granular shape were melted in an induction furnace, the chromium containing 2.2 percent carbon. After this pulverized tungsten carbide ($W_2C$) with a carbon content of about 3.16 percent and a grain size of from 2 to 5 microns was added to the melt, the tungsten carbide being manufactured by melting together tungsten and carbon. The melt was being stirred by the eddy currents induced in it during adding the tungsten carbide. After a further short period of inductive stirring brought about by the furnace, portions of the melt were withdrawn into quartz tubes by the application to them of a vacuum. The internal diameter and length of the quartz tubes corresponded to the measurements of the finished welding rod. After the withdrawn portions of the melt had solidified, the welding rods were withdrawn from the tubes. By means of microsections the micrographs shown in FIGS. 3 and 4 were produced. FIG. 3 clearly shows a fine dendritic structure which, as can be seen in the electronic optical picture of FIG. 4 hardly contains any black chromium carbide but instead only white-looking tungsten carbide with a uniform distribution in the matrix which has a comparatively low carbon content and thus great toughness. Deposited layers produced from these rods had a very uniform distribution of the tungsten carbide and had great wear resistance when the deposition was made by gas welding. Abrasion tests showed that the abrasion was only about 20 percent of the abrasion produced of a deposited layer produced from the welding rods made from the stellite comparison alloy. The hardness of the layer produced from rods made in accordance with the invention was uniformly 47 to 48 RC whereas the elongation of a test piece of the weld amounted to 3 percent. The relatively great elongation results in a reduced tendency to cracking of the deposited layer. This elongation can be improved even further if the carbon content of the initial melt and hence its content of chromium carbide is reduced still further. This will not result in any deterioration of the hardness and wear resistance as these are both dependent on the fine and evenly distributed $W_2C$ particles.

When an arc deposition technique was used, the wear resistance was less high than with gas welding, and this is probably due to the fact that the tungsten carbide dissociates at the high temperature of the arc and carbon is thus released which, together with the chromium forms the undesirable chromium carbide.

I claim:

1. In a process for making carbide-containing welding rods from a metal melt, the improvement which comprises the steps of continuously stirring said melt, adding carbide which is in granular form and has a melting point above the temperature of the melt to the melt and drawing portions of the carbide-containing melt off into heat resistant vacuum tubes while said stirring continues and allowing said portions to solidify in said tubes to form said rods.

2. A process as claimed in claim 1, in which a basic melt which consists of up to 3 percent carbon, from 15 percent to 35 percent chromium, from 40 percent to 65 percent cobalt, up to 4 percent silicon and the remainder iron, is added up to about 40 percent of tungsten carbide all the percentage of said tungsten carbide being by weight of the entire melt.

3. A process as claimed in claim 2, in which at least 7 percent of tungsten carbide is added to said melt.

4. A process as claimed in claim 2, wherein said tungsten carbide is added in the form of mixed crystals containing titanium, tantalum or niobium carbide.

5. A process as claimed in claim 1, in which said carbide is tungsten carbide with a grain size of about 1 micron and is manufactured by melting together tungsten and carbide.

6. A process as claimed in claim 1, in which the carbon content of said melt before the addition of said carbide is less than 1 percent by weight.

7. A process as claimed in claim 1, wherein said melt includes cobalt and carbon and further comprising the step of adding chromium to said melt after adding said carbide.

8. A process as claimed in claim 1, further comprising the step of water-cooling said vacuum tubes.

9. A process as claimed in claim 1, in which said vacuum tubes are made of quartz.

10. A process as claimed in claim 1, wherein said continuous stirring is performed by electrical induction.